US005538591A

United States Patent [19]

Collins et al.

[11] Patent Number: 5,538,591

[45] Date of Patent: Jul. 23, 1996

[54] TAPE CUTTING APPARATUS

[75] Inventors: Ian Collins, Houghton; Robert C. L. Day, Girton; Alan R. Cooper, Haslingfield, all of United Kingdom; Erik Opgenhaffen, Nieuwkerken Waas; Geert Heyse, Louvain, both of Belgium

[73] Assignee: Esselte Dymo N.V., St. Niklaas, Belgium

[21] Appl. No.: 418,916

[22] Filed: Apr. 6, 1995

Related U.S. Application Data

[63] Continuation of Ser. No. 90,847, Jul. 12, 1993, abandoned, which is a continuation of Ser. No. 48,593, Apr. 16, 1993, abandoned.

[30] Foreign Application Priority Data

Apr. 21, 1992 [GB] United Kingdom .................. 9208533

[51] Int. Cl.[6] .................................................. B32B 35/00

[52] U.S. Cl. .............................. 156/584; 346/24; 83/176; 83/658; 83/694; 83/858

[58] Field of Search .................................... 156/515, 530, 156/584; 83/175, 176, 440, 446, 509, 658, 694, 858; 72/186, 331, 338; 346/24; 101/3.1

[56] References Cited

U.S. PATENT DOCUMENTS

| | | | |
|---|---|---|---|
| 1,742,295 | 1/1930 | Young . | |
| 2,185,885 | 1/1940 | Bruker et al. | 83/176 X |
| 2,372,020 | 3/1945 | Sandberg | 83/176 X |
| 3,423,984 | 1/1969 | Keymer | 72/338 |
| 3,435,717 | 4/1969 | Macomber | 83/176 |
| 3,530,028 | 9/1970 | Messmer | 156/584 |
| 3,533,616 | 10/1970 | Bettenhausen | 83/175 X |
| 3,755,049 | 8/1973 | Leloux | 156/584 |
| 3,902,954 | 9/1975 | Lotto | 83/175 |
| 4,173,507 | 11/1979 | Tobey | 156/584 X |
| 4,685,991 | 8/1987 | Herrmann et al. | 156/344 |
| 5,066,152 | 11/1991 | Kuzuya et al. | 400/621 |
| 5,259,681 | 11/1993 | Kitazawa et al. | 400/621 |

FOREIGN PATENT DOCUMENTS

| | | | |
|---|---|---|---|
| 0077127A3 | 4/1983 | European Pat. Off. | B26D 5/02 |
| 0214461A2 | 3/1987 | European Pat. Off. | B26F 3/00 |
| 0215397A2 | 3/1987 | European Pat. Off. | H05K 3/00 |
| 0319209 | 6/1989 | European Pat. Off. | B26D 3/08 |
| 0506257A1 | 9/1992 | European Pat. Off. | B65C 9/00 |
| 0526213A2 | 2/1993 | European Pat. Off. | B26D 7/08 |
| 1173784 | 7/1964 | Germany | B31D 02/B1 |
| 3730810A3 | 3/1989 | Germany | A24D 3/02 |
| 2008028 | 5/1979 | United Kingdom | B32B 35/00 |
| WO89/10888 | 11/1989 | WIPO | B65H 23/038 |

*Primary Examiner*—Mark A. Osele
*Attorney, Agent, or Firm*—Pennie & Edmonds

[57] ABSTRACT

A tape cutting apparatus is described for cutting off a portion of tape (4) comprising first and second layers (4*a*,4*c*) secured one to another by an adhesive layer (4*b*). The apparatus comprises an anvil (40) and a cutter support member (31) carrying a blade (30), the cutter support member and the anvil being mounted for relative movement to bring the blade into contact with a facing surface of the anvil. The facing surface has a stepped portion (40) over which the tape is bent during cutting such that when the tape is released the first and second layers tend to separate from one another at the cut edge.

43 Claims, 5 Drawing Sheets

TAPE CUTTING APPARATUS

This application is a continuation of application Ser. No. 08/090,847 filed Jul. 12, 1993, abandoned, which is a continuation of application Ser. No. 08/048,593 filed Apr. 16, 1993, abandoned.

The present invention relates to tape cutting apparatus and is particularly but not exclusively concerned with cutting tape used in thermal printing devices.

Thermal printing devices of the type with which the present invention is primarily concerned operate with a supply of tape arranged to receive an image and a means for transferring image onto the tape. In one form, a tape holding case holds a supply of image receiving tape and a supply of an image transfer ribbon, the image receiving tape and the transfer ribbon being passed in overlap through a printing zone of the printing device. A printing device operating with a tape holding case of this type is described for example in EP-A-0267890 (Varitronics, Inc.). Other printing devices have been made in which letters are transferred to an image receiving tape by a dry lettering or dry film impression process. In all of these printing devices, the construction of the image receiving tape is substantially the same. That is, it comprises an upper layer for receiving an image which is secured to a releaseable backing layer by a layer of adhesive. Once an image or message has been printed on the tape, it is desired to cut off that portion of the tape to enable it to be used as a label. For this purpose, it is necessary to remove the releaseable backing layer from the upper layer to enable the upper layer to be secured to a surface by means of the adhesive layer. With existing printing devices, it is difficult to remove the releaseable backing layer from the upper layer: it is necessary first to separate the closely adhered end portions of the releaseable backing layer and the upper layer, for example using a fingernail or tweezers so that the separated end portion of the releaseable backing layer can be finger gripped to peel it off the adhesive layer. This is a relatively difficult procedure and furthermore can result in the ends of the label being damaged in the process.

There have been several attempts to solve this problem. Most such attempts have sought to rely on the provision of a so-called tab cut. In these devices, a first cut is made completely through all the layers of the tape to cut off a portion of the tape and at the same time a cut is made through only one layer of the tape. This provides a "tab" which, in theory, can be peeled away reasonably easily. While a tab cut has been implemented successfully with relatively thick, stiff upper layers there are significant difficulties in implementing so-called tab cut devices for tapes of the type used in thermal printing devices, where the upper layer is generally a thin, resilient polyester material. Although there have been several proposals, no such tab cut has successfully been implemented in a thermal printing device. By way of example, reference is made to EP-A-0319209 which describes one attempt to form a tab cut system.

The present invention provides a different solution to the problem of enabling the releaseable backing sheet to be removed easily, by providing a cutting system which causes the end portions of the tape to separate as a result of the cutting operation.

SUMMARY OF THE INVENTION

According to the present invention there is provided a tape cutting apparatus for cutting off a portion of tape comprising first and second layers secured one to another by an adhesive layer, the apparatus comprising a cutter support member carrying a blade and being mounted for movement relative to a tape support location where the tape is supported to bring the blade into contact with the tape, there being provided a tape bending surface over which the tape is bent such that when the tape is released the first and second layers tend to separate from one another at or adjacent the cut edge.

In one embodiment, tape is supported by an anvil having a stepped portion over which the tape is bent and a facing surface against which the tape rests during cutting. The blade then acts against the anvil for cutting, while the tape is bent over the stepped portion.

This type of cutting apparatus provides a separation between the first and second layers of the tape at the leading edge of the next portion to be cut. Thus, the releaseable backing layer can easily be peeled away from the upper layer. The invention is particularly applicable to cut tapes in which the first layer of said tape is formed of a material having a resilience greater than that of the second layer, wherein the second layer lies against the facing surface of the anvil during cutting.

The invention also Contemplates apparatus capable of providing separation between the layers of tape at the trailing edge of the label which has been cut. In this arrangement, the tape is supported at a cutting location adjacent which is the tape bending surface. The apparatus includes a tape bending member which is movable relative to the tape bending surface to cause the tape to bend over the tape bending surface. The arrangement can be such that the tape bending surface is actuated to bend the trailing region of the tape portion to be cut before cutting takes place.

BRIEF DESCRIPTION OF THE DRAWINGS

For a better understanding of the present invention and to show how the same may be carried into effect, reference will now be made, by way of example, to the accompanying drawings, in which.

Figure 5:
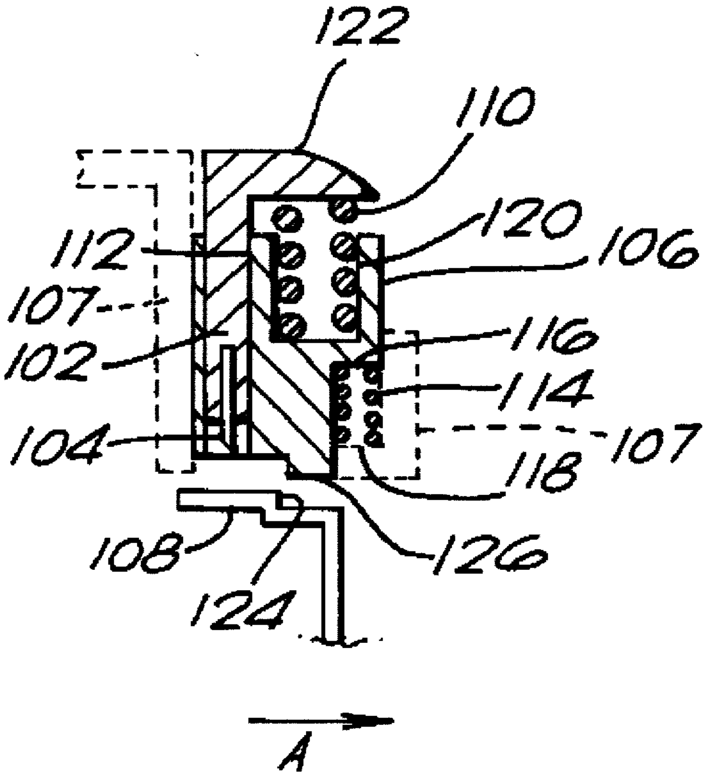
FIG. 5 shows another embodiment of a tape cutting apparatus.

FIGS. *6a* to *6c* show the embodiment of FIG. 5 during operation; and FIGS. *7a* and *7b* show a further embodiment in operation.

DETAILED DESCRIPTION OF THE INVENTION

Figure 1:
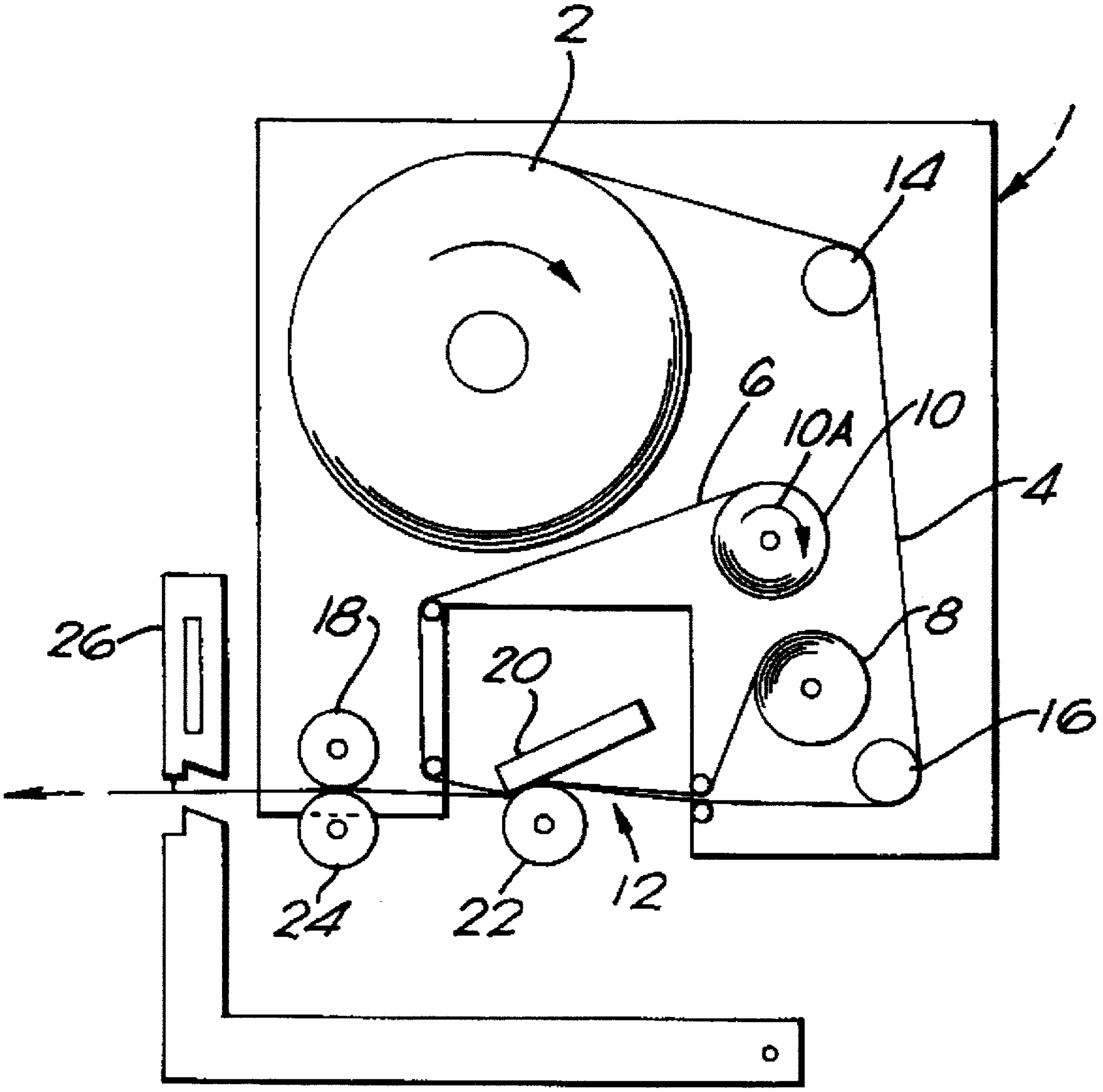
FIG. 1 is a diagrammatic plan view of a tape cassette shown in cooperation with a printing and feed mechanism and a tape cutting apparatus.

In FIG. 1, reference numeral 1 designates a tape holding case or cassette. The tape holding case contains a supply spool 2 of an image receiving tape 4. The image receiving tape comprises an upper layer which receives a printed image. The upper layer can for example be polyester or paper. The underside of the upper layer is coated with an adhesive layer to which is secured a releaseable backing layer. The construction of the image receiving tape 4 is described in more detail hereinafter with reference to the tape cutting apparatus.

The cassette 1 also houses an image transfer ribbon 6. The ribbon 6 extends from a supply spool 8 to a take-up spool 10. The take-up spool 10 is driven as indicated by arrow 10A in a direction to cause the ribbon 6 to be fed from the supply spool 8 to the take-up spool 10 via a print zone generally designated 12. The image receiving tape 4 is also guided through the print zone 12 overlapped with the transfer ribbon 6. Reference numerals 14 and 16 denote guide posts for guiding the image receiving tape 4 through the cassette 1. The cassette 1 also houses a feed roller 18.

The cassette 1 is intended to cooperate with a thermal printing device. The printing device carries a print head 20 and a platen 22. The print head is movable between an operative position shown in FIG. 1 in which it is in contact with the platen 22 and in which the image receiving tape and transfer ribbon are pinched in overlap between the print head and the platen and an inoperative position in which the tapes are released to enable the cassette to be removed. With the print head in contact with the platen, an image is transferred to the image receiving tape as a result of selectively heating pixels on the thermal print head. Such thermal printing devices are known, one example being illustrated in EP-A-0267890. The printing device also carries a drive roller 24 which cooperates with the feed roller 18 in the cassette 1 to draw the image receiving tape once printed past the print zone and out of the cassette 1. Once a message has been printed, the image receiving tape is fed out of the cassette to a cutting apparatus 26.

Figure 2:
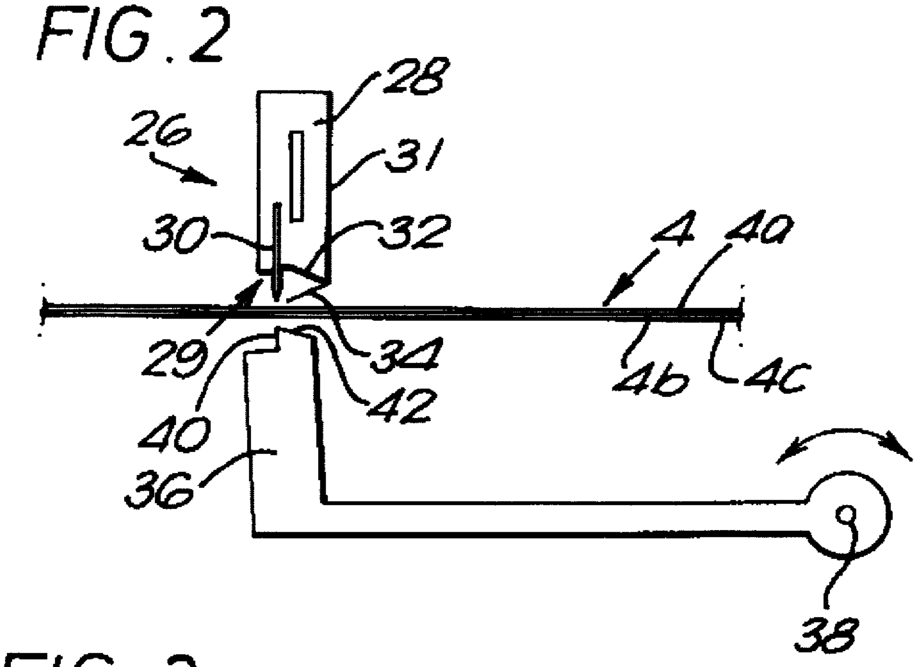
FIG. 2 shows the tape cutting apparatus in a tape print/feed position.

FIG. 2 shows the cutting apparatus 26 in the position as the image receiving tape is fed out of the cassette 1. As explained above, the image receiving tape 4 comprises an upper layer 4*a*, an adhesive layer 4b and a releaseable backing layer 4*c*.

The cutting apparatus 26 comprises a cutter support 28 carrying a blade 30. The blade 30 extends past the lower surface 29 of the cutter support means. The lower surface 29 of the cutter support 28 has a portion 32 which extends at an angle from one of the side walls 31 thereof to an intermediate portion of the lower surface 29.

A tape guide 34 is provided by a flexible element extending downwardly from the cutter support 28 along that side wall. In the described embodiment, the cutter support 28 is fixedly mounted to a printing device.

The tape cutting apparatus 26 further comprises an anvil 36 which is pivotably mounted about a shaft 38 secured to the printing device. The anvil 36 is movable towards and away from the cutter support 28. The upper surface of the anvil 36 has a stepped portion 40 and an angled portion 42. The angled portion 42 extends at an angle which is approximately the same as the angle of the lower surface portion 32 of the cutter support 28.

Figure 3:
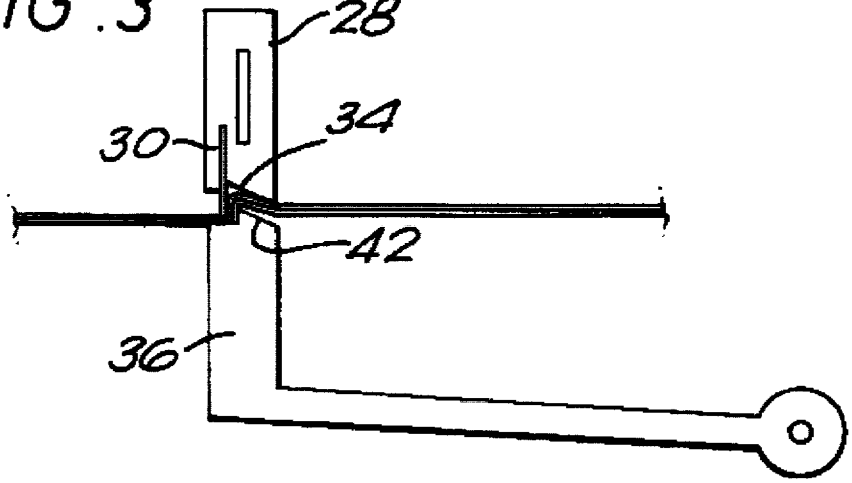
FIG. 3 shows the tape cutting apparatus in a cutting position.
Figure 4:
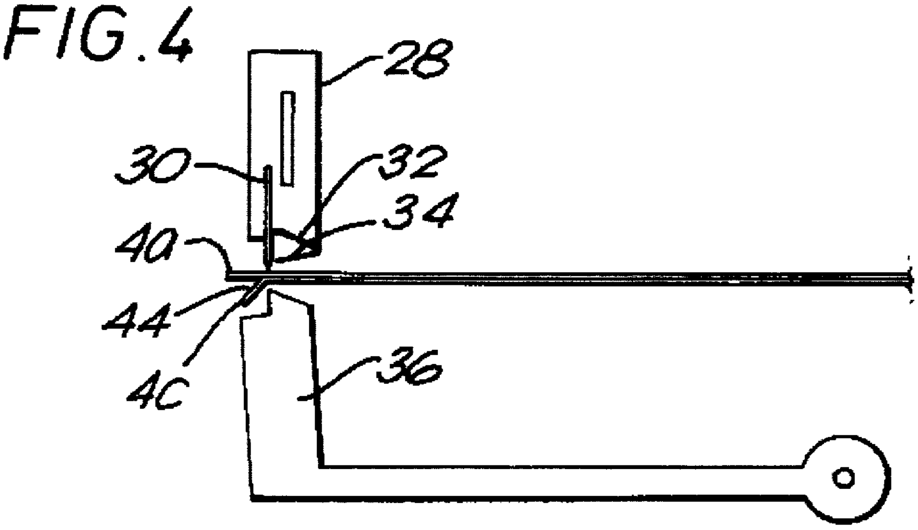
FIG. 4 shows the tape cutting apparatus in a cut and peel position.

The angled portion 42 of the anvil and the tape guide cooperate to act as a funnel to guide tape into the cutting apparatus on insertion of a new cassette. A cutting operation will now be described with reference to FIG. 3. In order to cut off a portion of the tape, the anvil 36 is pivoted about the shaft 38 so as to move upwardly to bring its upper surface into contact with the blade 30. This forces the stepped portion 40 against the releaseable layer 4*c* of the tape 4 and causes the tape guide 34 to bend against the angled surface portion 32 of the cutter support 28. The blade 30 acts against the upper surface of the anvil 36 to cut off a portion of the tape, this portion being to the left hand side of FIG. 3. The anvil 36 is then moved away from the blade 30 in the downwards direction to adopt the position shown in FIG. 4. As can be clearly seen in FIG. 4, the cutting operation which has just been executed has caused the image receiving tape 4 to be bent over the stepped portion 40 of the anvil 36. When the image receiving tape is bent in this way, the upper layer 4*a* is bent resiliently but not permanently deformed due both to its material properties and because the radius of the bend is greater than that undergone by the releaseable layer 4*c*. On the other hand, the releaseable layer 4*c* is permanently deformed by the bending action over the stepped portion both because of its material properties and the smaller bend radius. When the cutter apparatus is released, the natural tendency of the material forming the upper layer 4*a* is to straighten. However, the releaseable layer 4*c* remains bent and this creates a force between the two layers greater than that which the adhesive can withstand. As a result of this, the end portions of the tape to the left of the blade 30 separate following each cutting operation. The separated layers constitute a lead portion of the next part of the tape which, once printed, will be cut in the same way as described above with reference to FIG. 3. The label thus formed therefore has at its lead end a portion 44 which can be gripped by a user to enable the releaseable backing layer 4*c* easily to be pulled away from the upper layer to enable the label to be secured to a surface.

In this way, labels are formed which have a so-called easy-peel feature enabling the backing layer to be removed in a simple manner. The tape-cutting apparatus described herein is suitable for any thermal printing device which utilises an image receiving tape having the construction described herein, or an equivalent construction. In particular, it will be appreciated that the invention applies to the cutting of any tape where there are two layers secured by an adhesive, and that each layer can include more than one sub-layer. For example the tape cut in EP 0319209 has an upper layer comprising a clear tape secured to a carrier layer by adhesive, the upper layer having secured to the other side of the carrier a releaseable backing layer. Thus, the releaseable backing layer could be separated from the upper layer using the present invention.

FIG. 5 shows an alternative cutting arrangement, which provides a so-called "peel-cut" adjacent the trailing end of a portion of tape. The cutting arrangement comprises a cutter support member 102 carrying a blade 104 and a tape bending member 106. The cutter support member 102 is mounted for sliding movement within a slot 112 in the tape bending member. The broken line in FIG. 5 denotes the casing 107 of a printer or other support for the cutting arrangement. Reference numeral 108 denotes a surface for supporting a tape to be cut. The tape support surface 108 has a stepped portion 124 which cooperates with a step 126 provided in the tape bending member 106 in a manner which will be described more clearly hereinafter. In FIG. 5, tape will exit from the printing device from the left to the right, as indicated by arrow A. A relatively weak spring 114 is located between a ledge 116 of the tape bending member and a cooperating ledge 118 of the casing 107. A relatively stiff spring 110 is located in a recess 120 of the tape bending member 106 to act against the cutter support member 102. The cutter support member provides a surface which is preferably formed in the shape of a button 122 or the like and which can be depressed by a user using manual force.

Figure 6A:
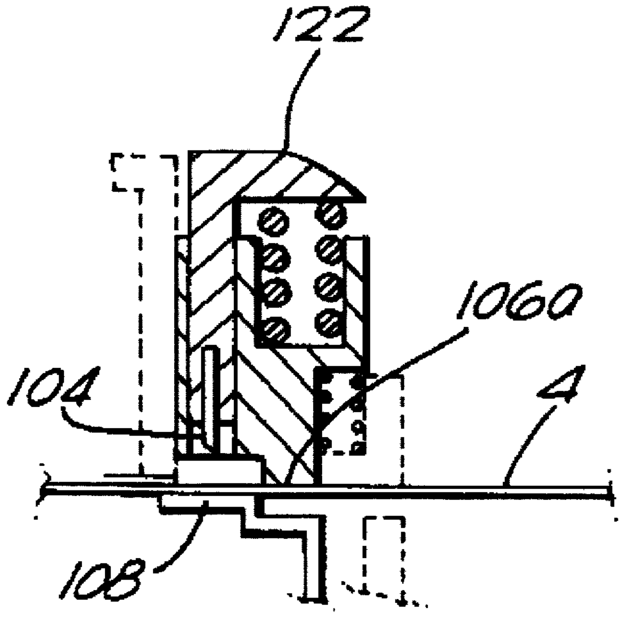
Figure 6B:
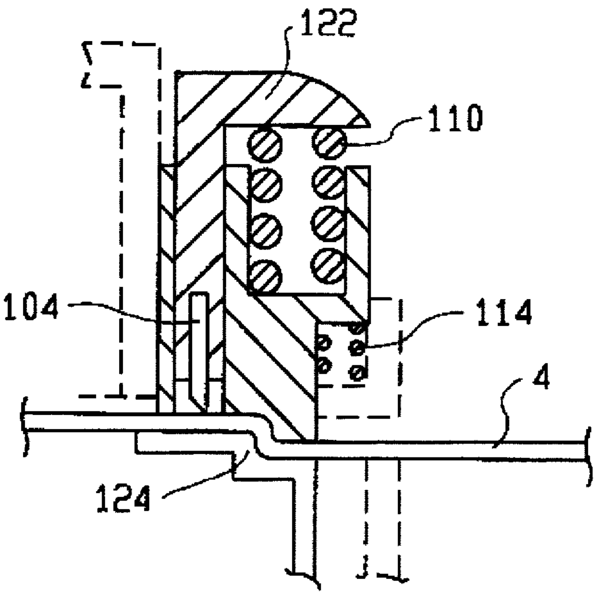
Figure 6C:
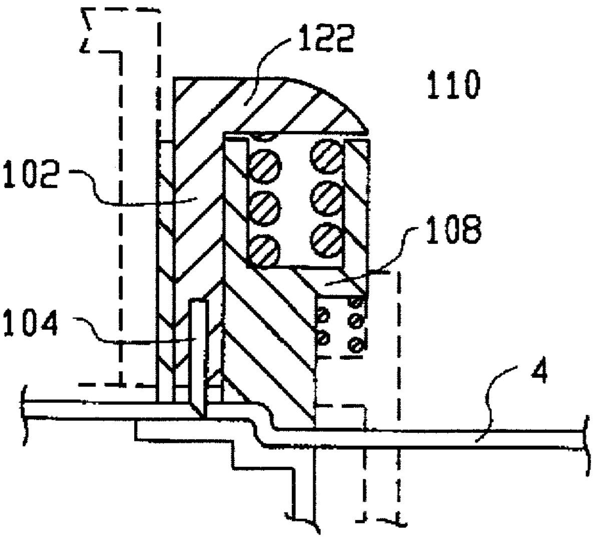

FIG. 6*a* to 6*c* show the cutting arrangement of FIG. 5 in use. FIG. 6*a* shows the cutting arrangement in its ready to cut state, that is with the blade 104 spaced from the tape 4 and the lower surface 106*a* of the tape bending member 106 just in contact with the tape 4.

When the button 122 is depressed, the relatively weak spring 114 is compressed first against the ledge 118 as shown in FIG. 6*b* and causes the tape bending member 106 to depress the tape 4 against the stepped portion 124 of the tape support surface, thereby bending the tape 4. The blade 104 is simultaneously caused to be lowered until it is just in contact with the tape 4. As the button 122 is further depressed (FIG. 6*c*), the relatively stiff spring 110 is depressed to cause the cutter support member 102 to move relative to the tape bending member 106 to cause the blade 104 to cut the tape. This then provides a portion of tape with a bent portion just behind the cut trailing edge. When the button 122 is released, the cutting arrangement resumes its ready-to-cut position under the action of the springs.

Figure 7A:
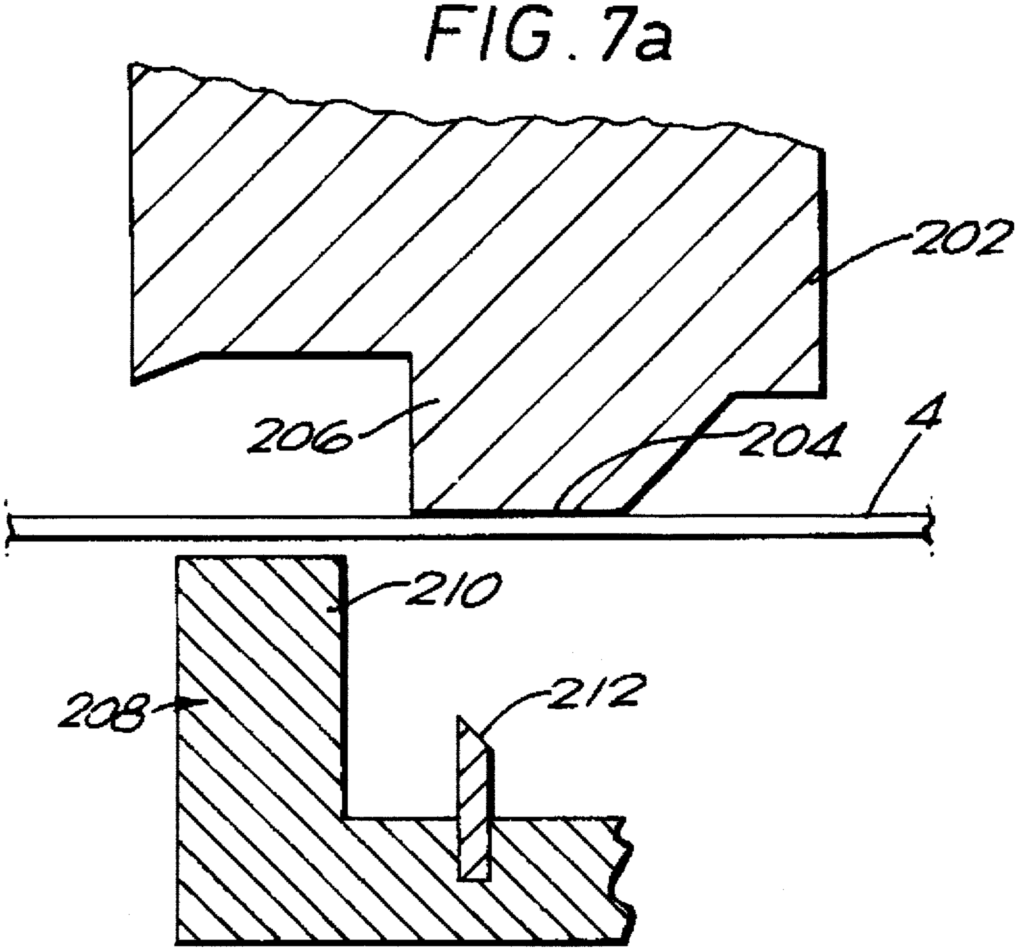
Figure 7B:
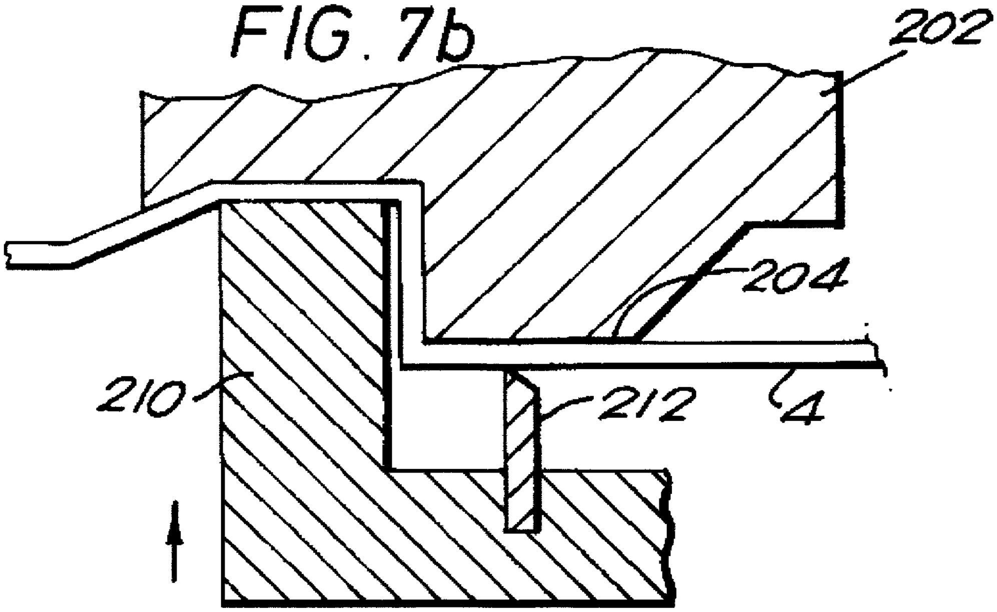

FIGS. 7*a* and 7*b* show an alternative embodiment of the invention. As shown in FIG. 7*a*, there is an anvil 202 having a cutting surface 204 against which the tape 4 rests during cutting. The anvil 202 has adjacent the surface 204 a stepped portion 206 over which the tape 4 is bent during cutting as described later. Reference numeral 208 denotes a moving cutter support member which has a tape bending part 210 and which carries a blade for cutting 212.

To perform a cutting operation, the moving cutter support 208 is moved towards the anvil 202 so that the tape bending part 210 bends the tape 4 against the stepped portion 206 of the anvil 202 and so that the blade 212 cuts the tape 4. This is shown in FIG. 7*b*.

When the blade is released after cutting, the substrate or image receiving layer recovers to its original shape whereas the backing layer, preferably of paper, remains bent so that the backing layer can be peeled off easily.

We claim:

1. A tape cutting apparatus for cutting off a portion of tape comprising first and second layers secured one to another by an adhesive layer, the first layer of said tape being formed of a material having a resilience greater than that of the second layer, the apparatus comprising:

a cutter support member carrying a blade and having a tape holding surface positioned and located to hold said tape during cutting;

a tape support surface which supports the tape during cutting at both sides of said cutting location with the second layer of the tape adjacent said tape support surface;

means for bringing the blade into contact with the tape at said cutting location during a cutting step in which the tape is held at both sides of said cutting location, the apparatus further comprising a tape bending surface over which the tape is bent during said cutting step such that when the tape is released the first and second layers tend to separate from one another at the cut edge.

2. A tape cutting apparatus as claimed in claim 1 wherein said tape support surface has a stepped portion over which the tape passes and which provides said tape bending surface.

3. A tape cutting apparatus as claimed in claim 2 in which the tape support surface includes the facing surface of an anvil against which the tape is cut by the blade.

4. A tape cutting apparatus as claimed in claim 3 in which the anvil comprises an angled portion over which the tape extends before being bent over said stepped portion.

5. A tape cutting apparatus as claimed in claim 3 or 4 in which the cutter support member is fixedly mounted and the anvil is mounted for movement towards and away from said cutter support member.

6. A tape cutting apparatus as claimed in claim 1 in which the lower surface of the cutter support member comprises an angled surface portion facing said tape support location.

7. A tape cutting apparatus as claimed in claim 6 in which the cutter support member carries a tape guide arranged to move against said angled surface portion of the cutter support member during cutting.

8. In combination, a tape cutting apparatus as claimed in claim 1 and a supply of tape in which the first layer is formed of a polyester material and the second layer is formed of paper.

9. A tape cutting apparatus as claimed in claim 1 wherein the tape bending surface is located on the far side of the cutting location relative to the direction of movement of the tape.

10. A tape cutting apparatus as claimed in claim 1 which comprises a tape bending member capable of relative movement with respect to the tape bending surface to cause the tape to bend before it is cut.

11. A tape cutting apparatus as claimed in claim 1 wherein the cutting action causes the tape to be bent over the tape bending surface.

12. A tape cutting apparatus as claimed in claim 1 in which the tape is held during cutting on one side of the blade by the cutter support member and on the other side of the blade by a tape bending member.

13. A tape cutting apparatus as claimed in claim 1 in which the tape is held during cutting on one side of the blade by a moving cutter support member and on the other side of the blade by a cooperating drive roller and feed roller.

14. A tape cutting apparatus for cutting off a portion of tape comprising first and second layers secured one to another by an adhesive layer, the apparatus comprising:

a cutter support member carrying a blade and being mounted for movement relative to a tape support location where the tape is supported to bring the blade into contact with the tape;

an anvil having a facing surface which provides at the tape support location a tape support surface on which the tape is supported during cutting, said tape support surface having a stepped portion over which the tape passes, said anvil further comprising an angled portion over which the tape extends before being bent over said stepped portion.

15. A tape cutting apparatus as claimed in claim 14 in which the cutter support member is fixedly mounted and the anvil is mounted for movement towards and away from said cutter support member.

16. A tape cutting apparatus as claimed in claim 14 in which the lower surface of the cutter support member comprises an angled surface portion facing said tape support location.

17. A tape cutting apparatus as claimed in claim 16 in which the cutter support member carries a tape guide arranged to move against said angled surface portion of the cutter support member during cutting.

18. A tape cutting apparatus as claimed in claim 14 where the cutting action causes the tape to be bent over the tape bending surface.

19. A tape cutting apparatus for cutting off a portion of tape comprising first and second layers secured one to another by an adhesive layer, the apparatus comprising a cutter support member carrying a blade and being mounted for movement relative to a tape support location where the tape is supported to bring the blade into contact with the tape, the apparatus further comprising a tape bending surface over which the tape is bent such that when the tape is released the first and second layers tend to separate from one another at the cut edge, wherein the lower surface of the cutter support member comprises an angled surface portion facing said tape support location.

20. A tape cutting apparatus as claimed in claim 19 in which the cutter support member carries a tape guide arranged to move against said angled surface portion of the cutter support member during cutting.

21. A tape cutting apparatus as claimed in claim 19 wherein the cutting action causes the tape to be bent over the tape bending surface.

22. A tape cutting apparatus for cutting off a portion of tape comprising first and second layers secured one to another by an adhesive layer, the apparatus comprising a cutter support member carrying a blade and being mounted for movement relative to a tape support location where the tape is supported to bring the blade into contact with the tape, the apparatus further comprising a tape bending surface over which the tape is bent such that when the tape is released the first and second layers tend to separate from one another at the cut edge, wherein the tape bending surface is located on the far side of a cutting location where the tape is cut, relative to the direction of movement of the tape.

23. A tape cutting apparatus as claimed in claim 22 wherein there is provided at the tape support location a tape support surface facing the cutter support member for supporting the tape during cutting, the tape support surface having a stepped portion over which the tape passes and which provides said tape bending surface.

24. A tape cutting apparatus as claimed in claim 23 in which the tape support surface includes the facing surface of an anvil against which the tape is cut by the blade.

25. A tape cutting apparatus as claimed in claim 24 in which the anvil comprises an angled portion over which the tape extends before being bent over said stepped portion.

26. A tape cutting apparatus as claimed in claim 21 or 25 in which the cutter support member is fixedly mounted and the anvil is mounted for movement towards and away from said cutter support member.

27. A tape cutting apparatus as claimed in claim 22 in which the lower surface of the cutter support member comprises an angled surface portion facing said tape support location.

28. A tape cutting apparatus as claimed in claim 27 in which the cutter support member carries a tape guide arranged to move against said angled surface portion of the cutter support member during cutting.

29. In combination, a tape cutting apparatus as claimed in claim 22 and a supply of tape in which the first layer of said tape is formed of a material having a resilience greater than that of the second layer, wherein the second layer lies away from the blade during cutting.

30. A tape cutting apparatus as claimed in claim 29 in which the first layer is formed of a polyester material and the second layer is formed of paper.

31. In combination, a supply of tape and a tape cutting apparatus for cutting off a portion of said tape, said tape comprising first and second layers secured one to another by an adhesive layer, the first layer of said tape being formed of a material having a resilience greater than that of the second layer, the apparatus comprising:

a cutter support member carrying a blade and having a tape holding surface positioned and located to hold said tape during cutting;

a tape support surface which supports the tape during cutting at both sides of said cutting location with second layer of the tape adjacent said tape support surface;

means for bringing the blade into contact with the tape at said cutting location during a cutting step in which the tape is held at both sides of said cutting location, the apparatus further comprising a tape bending surface over which the tape is bent during said cutting step such that when the tape is released the first and second layers tend to separate from one another at the cut edge.

32. A printing device for printing an image on an image receiving tape comprising first and second layers secured one to another by an adhesive layer, the first layer of said image receiving tape being formed of a material having a resilience greater than that of the second layer, the device comprising:

a region for removably receiving a supply of said image receiving tape;

a printhead located at a print zone along a path of said image receiving tape for printing messages on said image receiving tape; and a tape cutting apparatus located to cut off a portion of said image receiving tape after printing, said tape cutting apparatus including a cutter support member carrying a blade and having a tape holding surface positioned and located to hold said image receiving tape during cutting, a tape support surface which supports the image receiving tape during cutting at both sides of said cutting location with the second layer of the image receiving tape adjacent said tape support surface, means for bringing the blade into contact with the image receiving tape at said cutting location during a cutting step in which the image receiving tape is held at both sides of said cutting location, and a tape bending surface over which the image receiving tape is bent during said cutting step such that when the image receiving tape is released the first and second layers tend to separate from one another at the cut edge.

33. A printing device as claimed in claim 32 wherein said tape support surface has a stepped portion over which the image receiving tape passes and which provides said tape bending surface.

34. A printing device as claimed in claim 33 in which the tape support surface includes the facing surface of an anvil against which the image receiving tape is cut by the blade.

35. A printing device as claimed in claim 34 in which the anvil comprises an angled portion over which the image receiving tape extends before being bent over said stepped portion.

36. A printing device as claimed in claim 34 or 36 in which the cutting support member is fixedly mounted and the anvil is mounted for movement towards and away from said cutter support member.

37. A printing device as claimed in claim 32 in which a lower surface of the cutting support member comprises an angled surface portion facing said tape support location.

38. A printing device as claimed in claim 37 in which the cutter support member carries a tape guide arranged to move against said angled surface portion of the cutter support member during cutting.

39. A printing device as claimed in claim 32 wherein the tape bending surface is located on the far side of the cutting location relative to the direction of movement of the image receiving tape.

40. A printing device as claimed in claim 32 which comprises a tape bending member capable of relative movement with respect to the tape bending surface to cause the image receiving tape to bend before it is cut.

41. A printing device as claimed in claim 32 wherein the cutting action causes the image receiving tape to be bent over the tape bending surface.

42. In combination, a supply of image receiving tape and a printing device for printing an image on said image receiving tape, wherein said image receiving tape comprises first and second layers secured one to another by an adhesive layer, the first layer of said image receiving tape being formed of a material having a resilience greater than that of the second layer, and wherein the printing device comprises:

a printhead located at a print zone along a path of said image receiving tape for printing messages on said image receiving tape;

a tape cutting apparatus located to cut off a portion of said image receiving tape after printing and which comprises:

a cutter support member carrying a blade and having a tape holding surface located to hold said image receiving tape during cutting;

a tape support surface which supports the image receiving tape during cutting at both sides of said cutting location with the second layer of the image receiving tape adjacent said tape support surface;

means for bringing the blade into contact with the image receiving tape at said cutting location during a cutting step in which the image receiving tape is held at both sides of said cutting location; and a tape bending surface over which the image receiving tape is bent during said cutting step such that when the image receiving tape is released the first and second layers tend to separate from one another at the cut edge.

43. A combination according to claim 42 wherein the supply of image receiving tape is housed in a cassette.

* * * * *